United States Patent [19]

Hayford, Jr.

[11] Patent Number: 4,518,164
[45] Date of Patent: May 21, 1985

[54] VIDEO GAME CONTROL CONSOLE

[76] Inventor: Robert L. Hayford, Jr., 500 Mosser Dr., Lafayette, La. 70508

[21] Appl. No.: 550,372

[22] Filed: Nov. 10, 1983

[51] Int. Cl.³ ............................................. A63B 71/00
[52] U.S. Cl. ................................ 273/148 B; 224/222; 248/346; 108/43
[58] Field of Search .................. 273/148 B, DIG. 28; 224/222; 248/346; 108/43, 26

[56] References Cited

U.S. PATENT DOCUMENTS 4,484,743 11/1984 Williams ........................ 273/148 B Primary Examiner—Richard C. Pinkham
Assistant Examiner—Scott L. Brown
Attorney, Agent, or Firm—Charles C. Garvey

[57] ABSTRACT

An improved video game control console is provided for use with home video game computers. The apparatus adjusts to the lap of the players by using a pair of spaced apart controller containers which slide upon a frame. Each container is centered on each leg respectively of the player and can be fastened thereto. The two controller containers are clamped upon the frame when the desired spacing is reached. The containers have ample surface area so that oversized controls can be used which facilitate better play with less player fatigue.

10 Claims, 5 Drawing Figures

VIDEO GAME CONTROL CONSOLE

BACKGROUND OF THE INVENTION

1. Field of the Invention

The present invention relates to the control mechanisms for use with home video game computers. The present invention more particularly relates to an adjustable video game control console which can be sized to sit on the lap of the player, so that the player's upper leg area support multiple containers carrying various controller components.

2. General Background

Video game computers in use have various control mechanisms, one of which is a directional movement control stick, commonly known as a "joy stick". The circumference of the joy stick is somewhat larger than the circumference of a pencil or pen. The lower end of the joy stick is attached to a base container of hard plastic or metal which fits comfortably into the palm of the hand of adult players. A trigger button which controls various game functions can be located at the top of the joy stick. The joy stick and trigger button can be linked to the video game computer by a flexible wire. Players command the game action on a video screen by pressing the trigger button and/or by rotating the joy stick. Typical commands transmitted by pressing the trigger button include e.g., the firing of bullets and missiles; the jumping of human or animal figures; and, resetting the game. These functions are activated on video games in commercial establishments by rapidly pressing a large button that can be separate and spaced from the directional movement control or "joy stick".

The "joy stick" directs the movement of a game object, typically a tank, space ship, animal or human figure, on the video screen. The joy stick is rotable on its base over a range of 360°, and directs the movement of the game object on the screen in any direction within a like range. For example, moving the joy stick forward or away from the player may cause the game object to move up the screen, while moving the joy stick backwards or toward the player may move the object down screen. Movement of the joy stick to the right or left moves the game object to the right or left. In commercial establishments, the video game directional movement controls are typically activated by large buttons or moving levers having a bulbous protrusion at one end for the player to grasp.

At least one video game has a keyboard as part of the game control mechanism. The keyboard, like the base of the joy stick is compact enough to fit into the palm of the hand of an adult player. The keyboard allows the player to enter additional information into the video computer while game is in play. The keyboard allows the player to select views from the windows of the space ship, to align targets between the cross hairs on the scopes of firing mechanisms and the like. Keyboards may be used e.g. to select the video game to be played, the experience level of the player and/or the number of persons playing the video game. Joy sticks, controller buttons and such video game control mechanisms are known per se, and are manufactured and sold nationally.

Home video game control mechanisms are usually much smaller than their commercial counterparts. These smaller units are awkward to use. Unlike the video games found in commercial establishments such as video arcades, shopping malls, restaurants, grocery stores and lounges, home video game controls are not set in the video game computer console. The home video game controls are either held in the hand or placed on a level surface such as a table or desk top. During play, these smaller home video control mechanisms can slip, slide or tilt in the hand or on the table surface. The slipping, sliding and tilting of the control mechanism interferes with the player giving timely and accurate commands to the computer. Fatigue sets in after long time periods of play as the player is required to fully support the controller with a hand and manipulate the joystick, button or keyboard with the other hand. Blisters can develop where the hand continuously squeezes the controller in the same place. These problems have plagued the art and have blistered the hands of many a video competitor-young and old.

There are several lap supported tray type devices which have been patented.

U.S. Pat. No. 2,663,603 issued to I. Newman shows a lap tray that can be attached to users lap by a clamping mechanism. The tray allows the user to balance items such as foods and beverages conveniently on his lap.

U.S. Pat. No. 2,844,429 issued to E. Frey illustrates a lap try having a rectangular top, a pair of support plates which are slidably mounted on tracks under the tray top. The support plates are hingedly affixed to panels, which when in use abut the outer sides of the user's legs.

U.S. Pat. No. 2,750,705 issued to L. P. Keveney discloses a lap board fishhook extracting device, having a flat top surface and a pair of side retainers that abut against the outer sides of the user's legs.

GENERAL DISCUSSION OF THE PRESENT INVENTION

The preferred embodiment of the apparatus of the present invention provides a video game control console for use with home video game computers. It is a device comprising first and second preferably rectangular video game control containers. The video game control containers are connected together by a frame having horizontal cross members. The video game control containers are slidable upon the frame cross members to adjust the distance between the containers to fit the size of the lap of the individual player. Each video game container can be desirably centered on each leg of the player. The upper legs of the player then support each container, leaving the player's hands free to manipulate the controls. The positions of the control containers may be interchangeable on the frame in relation to one another, to accommodate the manual dexterity of left or right-handed players.

The controller containers are made of light weight structural materials such as plastic or metal so that it can be comfortably supported upon the laps of even very young players. Cushioning in the form of slip-resistant material such as foam rubber can be affixed to the bottom surface of the video game control containers to increase the comfort of players and to prevent the video game console from easily slipping from the player's lap or table-top.

Leg straps carried by each container may be clasped together by using buckles, Velcro, and the like. The leg straps can further stabilize the video game console on the player's lap and prevent the video game control mechanisms, such as the joy stick or directional movement grip, the keyboard, trigger button and/or command button from slipping, sliding or tilting during use.

Since the two controller containers are supported by and affixed to the player's legs, the problem of blisters is eliminated, at least with regard to blisters generated by hand support of the individual controller container. The player can sit in a chair or on the floor with knees bent or crossed. With the present invention, the containers are merely adjusted to fit the upper leg position of the player, whatever sitting position the player selects. The same apparatus can be used by all family members including small children and large adults.

A first video game control container has a directional movement grip that performs the same function as the joy stick of conventional video game control mechanisms. However, with the present invention, its size can be substantially increased to a size much larger than the typical "pen-size" joy stick presently seen on the market. A larger directional movement grip can be provided with the present invention which is easier to grasp and direct than the smaller joy sticks currently available. A larger joy stick or a larger button or the like can be used because the present invention uses multiple, spaced apart controller containers which can be adjusted into multiple positions with respect to each other.

The directional movement grip can have a trigger button on its front surface slightly below the top of the grip. The trigger button may be pushed by either player's thumb or forefinger. The trigger button, like the trigger button on the conventional joy stick, transmits commands to the video computer regarding the firing of bullets or missiles; the leaping movement of human or animal figures; or resetting the game. The base of the directional movement grip can be recessed below the top surface of first video game control console and is made of flexible structural material which allows the directional movement grip to be rotated in a range of 360°.

A second video game control container has on its top surface a command button, that can be of a substantially larger diameter than trigger buttons on the joy stick or on directional movement grip. The command button serves the same function as the trigger button however. The command button is linked by a flexible wire to the trigger button and can be used as an alternative game control mechanism. The larger command button can be pounded, slapped or hit by players who have difficulty repeatedly pushing the trigger button. Use of the larger button tends to increase the game skills of players since the game objects appearing on the video screen perform their firing and leaping functions with greater rapidity thereby creating higher game scores.

Second video game control container may have a keyboard which protrudes through the top surface of the container. The function of the keyboard is that of conventional electronic control keyboards, e.g., allowing the players to input information into the video computer while the game is being played. Some keyboards have holders into which game button identification cards may be inserted over the keyboard. Greater stability of operation is achieved by mounting the keyboard to the second video game control container.

The object of this invention is thus to provide a new and improved adjustable, lap supported video game control mechanism which provides greater stability and fit during use.

A further object of the invention is to provide an enlarged video game control apparatus that is adjustably fitted to each player's lap, and which simulates the large control console of expensive commercial video game models.

A further object of the present invention is to provide a video game control apparatus which can be secured by the player's legs during use, relieving pressure points on the user's hands and thereby preventing blisters.

A further object of the present invention is to provide a video game control apparatus that can accommodate enlarged directional movement grips, enlarged buttons, keyboards and like controllers that may be easily grasped or actuated by the players.

BRIEF DESCRIPTION OF THE DRAWINGS

For a further understanding of the nature and objects of the present invention, references should be had to the following detailed description, taken in conjunction with the accompanying drawings, in which like parts are given like referenced numerals and wherein.

DETAILED DESCRIPTION OF THE PREFERRED EMBODIMENT

Figure 1:
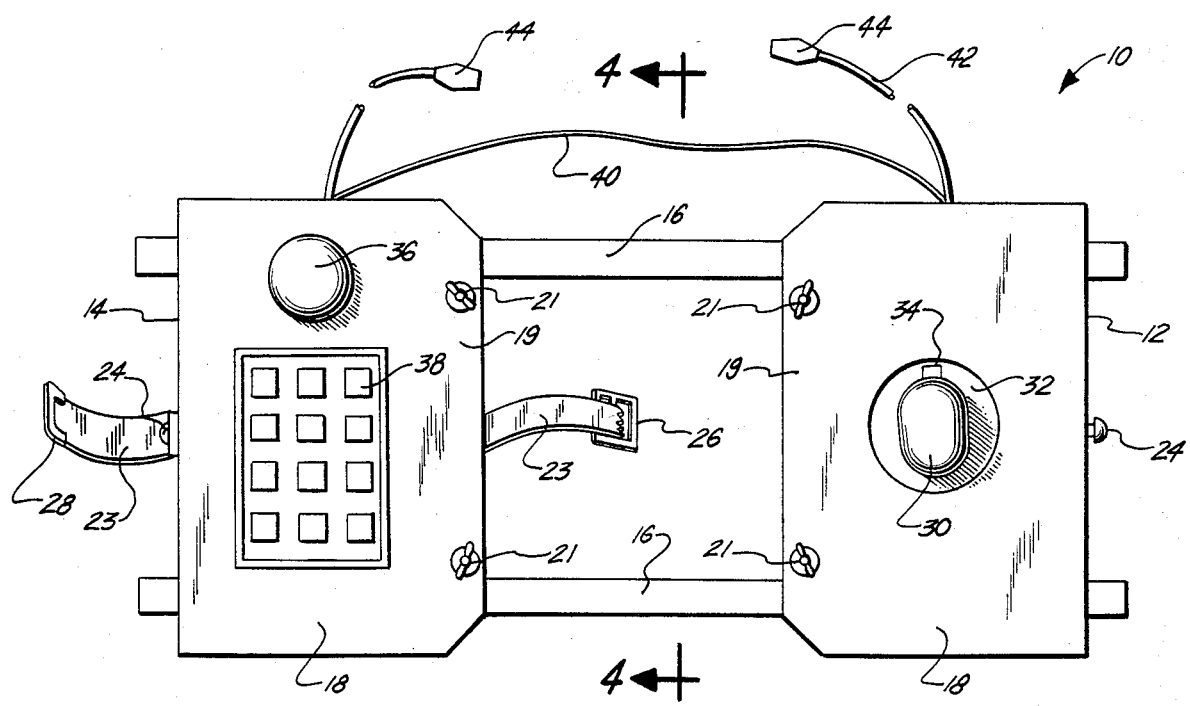
FIG. 1 is a top perspective view of the preferred embodiment of the video game control console of the present invention.
Figure 2:
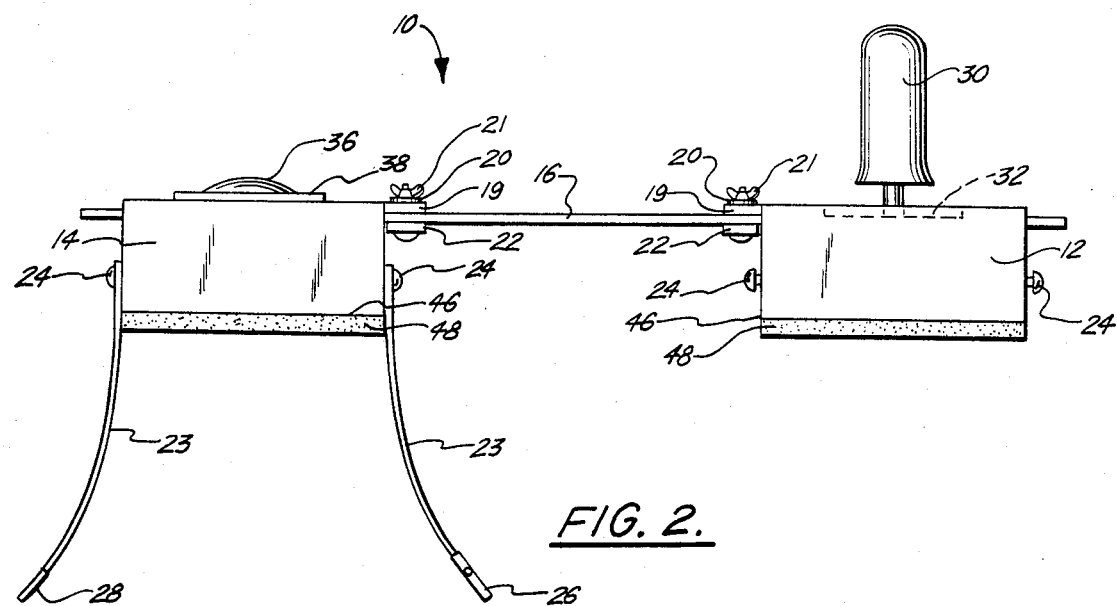
FIG. 2 is a sectional rear view of the video game console of the present invention.
Figure 3:
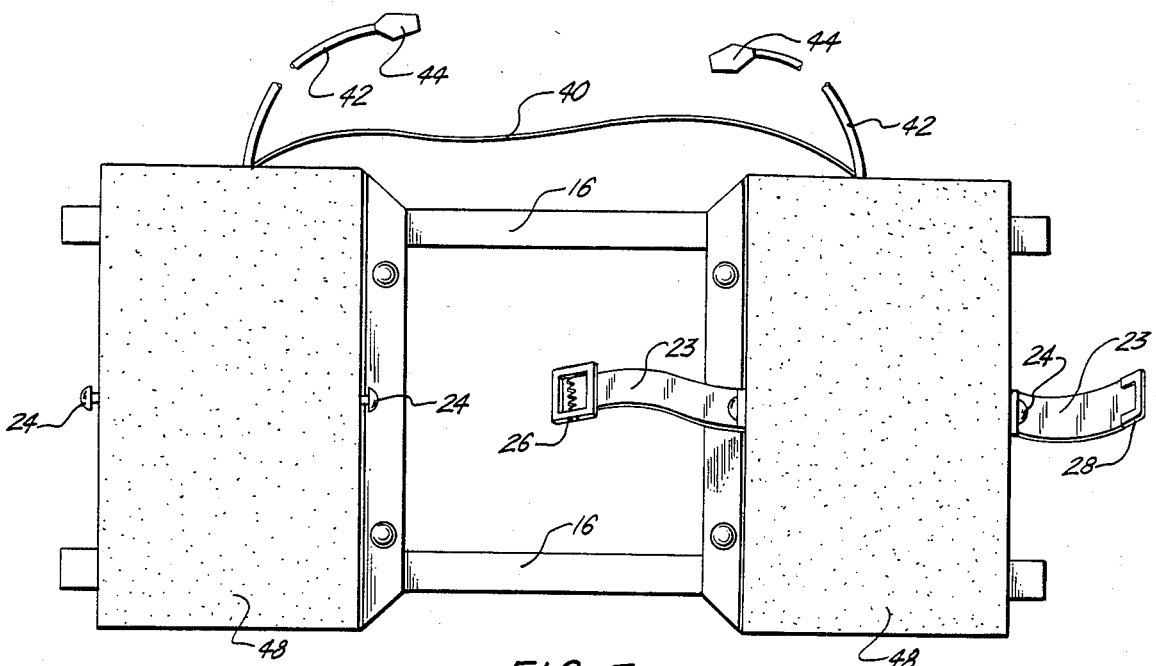
FIG. 3 is a bottom perspective view of the video game console of the present invention.
Figure 4:
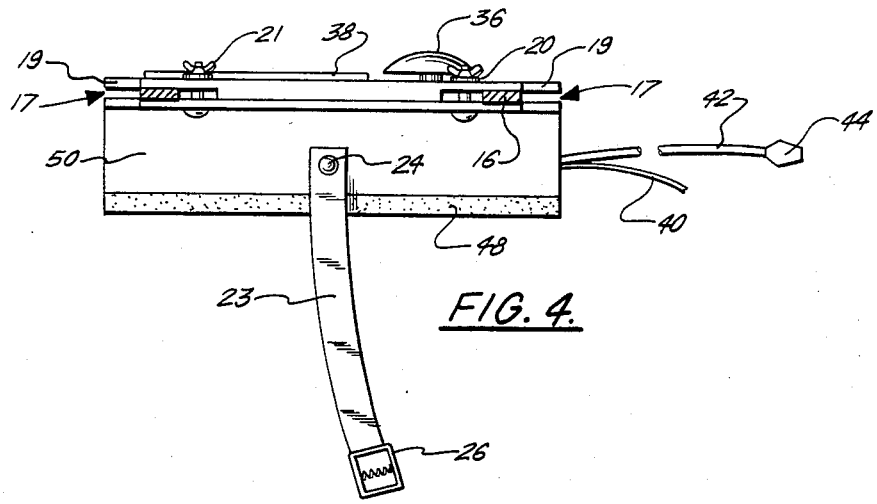
FIG. 4 is a side sectional view of the video game control console of the present invention taken across line 4—4 of FIG. 1.

FIGS. 1, 2 and 3 illustrate best the preferred embodiment of the apparatus of the present invention, generally designated by the numeral 10. Video game console 10 comprises a first video control container 12 and a second video control container 14 which are connected together by and slidable upon a frame defined by horizontal parallel cross members 16. Each container 12, 14 is preferably box-shaped, having upper and lower surfaces 18, 48. The upper top surface 18 features laterally extending lip 19 (FIGS. 2 and 4) which is spaced above its respective container 12, 14 defining a slot 17 which is receptive of cross members 16. When the clamp 20 and fastener 21 connection is tightened, lip 19 is drawn closer to clamp panel 22, thus reducing the thickness of slot 17. Clamp 20 and fasteners 21 also bias clamp panel 22 toward lip 19 and so that compression can be applied to cross members 16 (See FIG. 2). Tightening or loosening of clamps 20 and fasteners 21 allow video game console 10 to be adjusted to fit the size of the lap of the player. (See FIGS. 1, 2, 3 and 4). The two control containers 12, 14 can thus be adjustably positioned with respect to each other and then clamped into a desired position. A plurality of e.g. four (4) clamps 20 and fasteners 21 are shown. Each clamp 20 and fastener 21 is positioned adjacent the sliding connection of cross member 16 to a container 12, 14. In operation, the player adjusts the distance between each container 12, 14 so that a container 12, 14 is centered upon and supported by one of the player's legs respectively.

Leg attachments 23, are in the form of dual, connectable leg straps 23. Straps 23 are attached to video game control containers 12, 14 by means of a fastner 24 such as a snap, bolt or the like. Leg attachments 23 can be secured to the legs of the player by closure 26 such as a buckle. Tongue cover 28 of leg attachment 23 allows easy insertion of the opposing leg attachment means into closure 26. (See FIG. 1, 2, 3, and 4).

Figure 5:
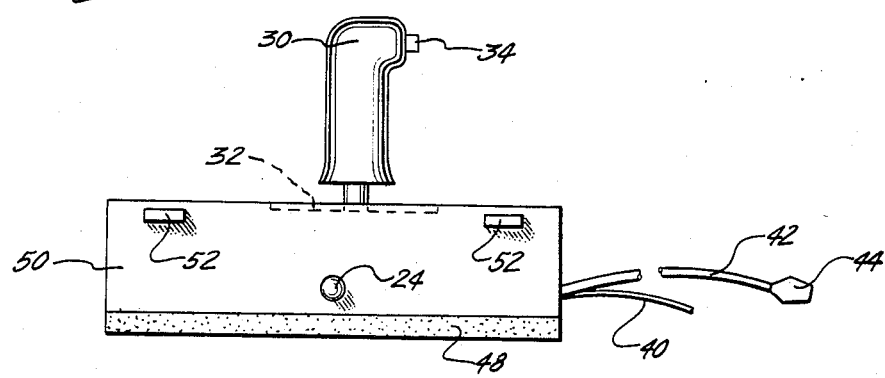
FIG. 5 is another sectional side view of the video game control console showing the first control container, control grip, command trigger and wire cable connectable to a video game computer.

Various controller components can be placed on the amply spaced container upper surfaces 18. As an example, directional movement grip 30 is flexibly attached to first video game control container 12 at base 32. Directional movement grip 30 has trigger 34 which serves variable functions depending upon the video game being played. (See FIG. 1 and 5).

A command button 36 is shown on second video game control container 14. Button 36 may serve the same function as trigger 34, but its larger size facilitates the play of games involving rapid, repeated motions such as the firing of missiles. (See FIGS. 1, 2, and 4).

A keyboard 38 of second video game control container 14 could provide for the input of desired information into a video game computer (Not shown) during play.

Flexible wire cable connectors 40 can link containers 12, 14 and any contained electrical components.

Flexible wire connectors 42 also link video game control console 10 and a video game computer (Not shown). Plugs 44 on flexible wire connector means 42 provide the direct connection with the video game computer (Not shown). (See FIGS. 1, 3, 4, and 5).

The bottom 46 of video game control containers 12, 14 are in the preferred embodiment composed of a rigid material to which is affixed a cushioning, non-slip material 48 which both protects the player's legs or table top during use and retards the slipping of console 10 from the player's lap during use. (See FIGS. 2, 3, 4 and 5). Surface 46 material 48 could be foam, rubber, neoprene or the like.

Sides 50 of first video game control container 12 and second video game control container 14 provide slots 52 through which cross member 16 is inserted. (See FIG. 5).

Changes and modifications in the specifically described embodiments can be carried out without departing from the scope of the invention which is intended to be limited only by the scope of the appended claims.

What is claimed as the invention is:

1. A game control console for video game controls comprising:
   (a) a support frame;
   (b) first and second spaced apart control containers adjustably mounted upon the frame so that the space between the containers can be varied, so that the relative position of the first and second control containers can be adjusted to the lap size of individual players, each container carrying one or more control components.

2. The game control console of claim 1 further comprising cushioned surface means at the base of the first and second control containers which abuts the player's legs during use.

3. The control console of claim 1 further comprising slip-resistent means on the base of the first and second control containers for preventing sliding of the control console from the player's legs during play.

4. The control console of claim 1 having lap attachment means carried by each control container, for securing the control containers to the legs of the player during use.

5. The control console of claim 1 wherein one of the components is a directional movement grip attached to first control container.

6. The control console of claim 1 wherein one compenent is an enlarged command button on second control container of dimensions receptive of a player's hand striking during use.

7. The control console of claim 1 wherein one component is a keyboard carried by the second control container.

8. The control console of claim 1 having a pair of flexible straps attached to one of the control containers; the straps securing the control console to the leg of the player during use.

9. The control console of claim 1 further comprising clamp means for securing each container to the frame at a desired position on the frame after the player selects the desired distance placement between the first and second console containers.

10. An adjustable game control console comprising:
   (a) first and second control containers of substantially equivalent dimensions, each container carrying at least one game control component;
   (b) at least one horizontally spanning frame cross member upon which the two control containers are slidable, so that the first and second control containers can be adjusted upon the frame cross member to a desired lap size of an individual player where each component is positioned respectively upon a leg of the player;
   (c) a lowermost interface at the base of first and second control containers, which is receptive of and rests upon a player's legs during use;
   (d) means carried by the base of the first and second control containers to retard inadvertant slippage of the console from the player's lap during use;
   (e) means carried by one of the control containers for removably securing the console to the legs of the player during use.
   (f) a game component including a directional movement grip attached to first control container;
   (g) a control trigger carried by directional movement grip;
   (h) a command button on one of the control containers;
   (i) a keyboard carried by one of the control containers.

* * * * *